Jan. 30, 1951

C. B. WATTS, JR 2,539,500

GLIDE PATH AND LOCALIZER SYSTEM

Filed Feb. 28, 1948

INVENTOR.
CHESTER B. WATTS, JR.

BY

*RP Morris*

ATTORNEY

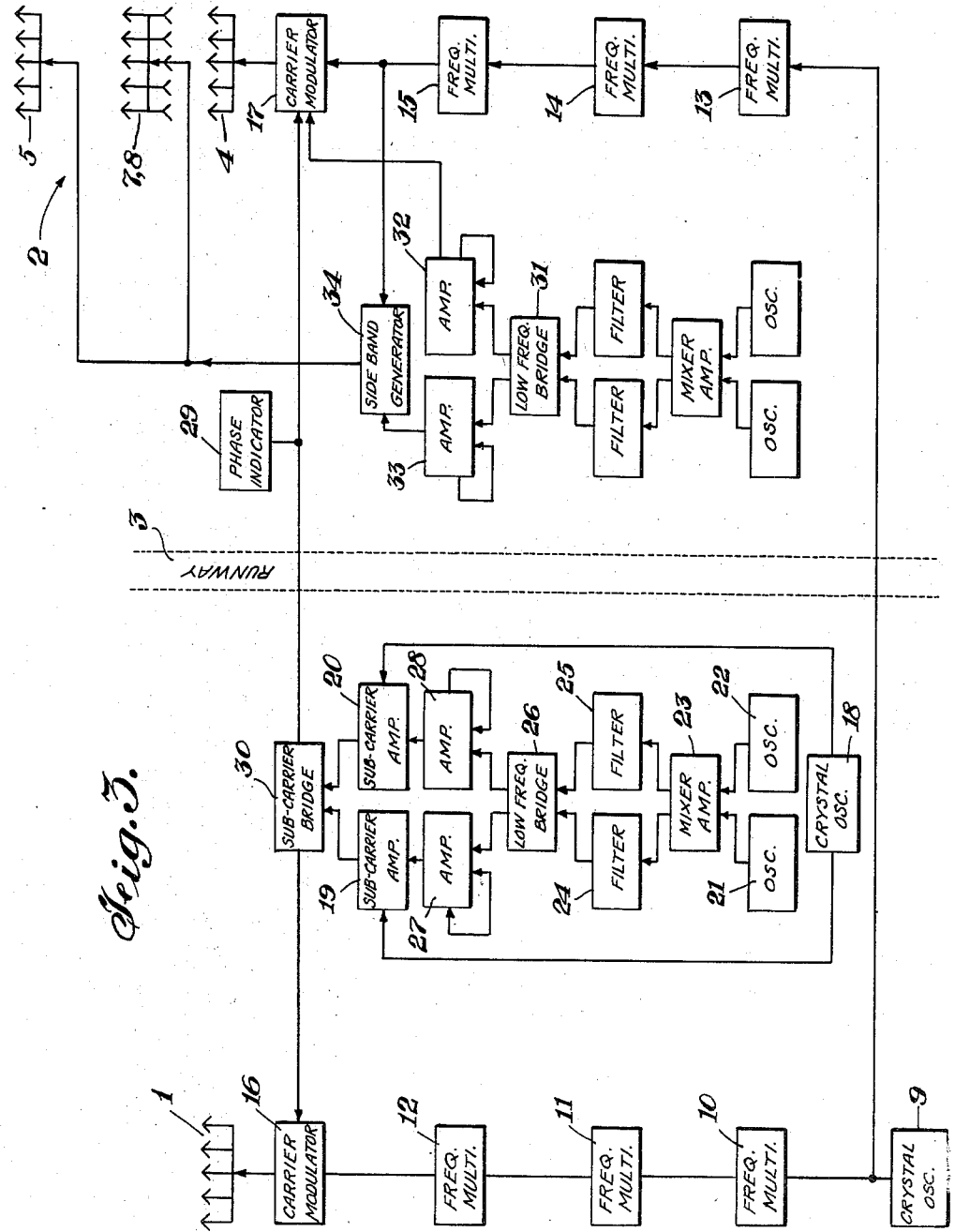

Patented Jan. 30, 1951

2,539,500

UNITED STATES PATENT OFFICE 2,539,500

GLIDE PATH AND LOCALIZER SYSTEM

Chester B. Watts, Jr., Indianapolis, Ind., assignor to International Standard Electric Corporation, New York, N. Y., a corporation of Delaware Application February 28, 1948, Serial No. 12,002

14 Claims. (Cl. 343—107)

This invention relates to aerial navigation systems and more particularly to an arrangement for guiding a mobile craft to a landing along an electromagnetically defined energy reference zone or line.

Previous aircraft instrument landing systems of the radiant energy beam type required that system transmitters be installed at the far end of the runway. On the other hand, present advancements in the field of aviation require the use of long runways and clear approaches which means that the system transmitting equipment would have to be located from one to two miles from the aircraft's point of contact with the runway upon landing. Under these conditions the continued use of the previous type instrument landing systems located at the far end of the runway results in indications which are not as accurate as desired unless the landing course is made sharper. However as the course is made sharper the accuracy of the course alignment with respect to the center line of the runway becomes unduly critical. Furthermore the separation of the localizer and glide path systems into two distinct units placed in different positions about the runway, in accordance with other previous systems, complicates installation and maintenance problems as well as necessitating a high cost of manufacture and operation. Also the installation of landing equipment in an area over which or through which aircraft are liable to fly provides objectionable obstacles to air traffic.

It is therefore an object of this invention to provide an improved combination of localizer and glide path beacons producing radiation patterns for the guidance of craft to a landing along a prescribed course.

In accordance with an embodiment of my invention the localizer antenna arrangement is divided into two units which are installed one on each side of the runway in the vicinity of the point of contact for transmitting radiant energy defining a localizer course characterized by sub-carrier frequency modulation of carrier frequency waves. The spacing between the units is made a desired fraction of a wavelength at the sub-carrier frequency to provide the desired course. The glide path arrangement is installed on one side of the runway in the vicinity of the point of contact for transmitting radiant energy defining the glide path course. The glide path unit comprises one of the localizer antenna units and may also include a modifier array for providing a desired straight line path in the vicinity of touchdown.

The above mentioned and other features and objects of the invention will become more apparent in the invention itself, though not necessarily defined by said features and objects, will be clearly understood by reference to the following description of an embodiment of the invention taken in connection with the accompanying drawings wherein:

Fig. 3 shows in block diagram form a circuit arrangement for producing glide path and localizer radiant energy patterns in accordance with the invention.

Figure 1:
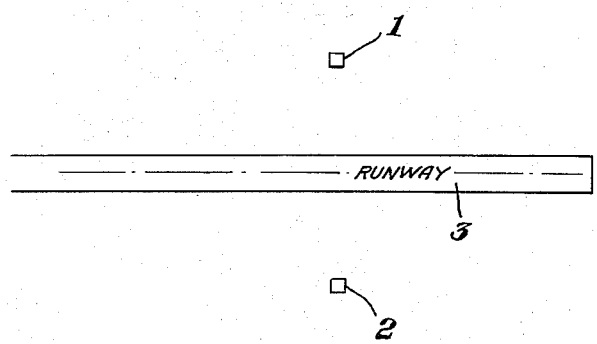
Fig. 1 illustrates in schematic form a localizer and glide path arrangement in accordance with the present invention.

According to Fig. 1 the localizer antenna system comprises two arrays, 1 and 2, preferably horizontally polarized and located symmetrically on each side of the runway, 3, near the point or region of contact of an aircraft upon landing. Preferably the antennas may be operated over a high frequency range, for example between 600 and 1000 megacycles per second because of aerodynamic as well as physical considerations. This is described in greater detail in the co-pending application of S. Pickles and C. Watts assigned to the same assignee, entitled "Localizer Beacon System" Ser. No. 6,638, filed February 6, 1948. As described in greater detail in the above mentioned co-pending application, the localizer course is not formed by interference of the carrier energy supplied to the radiators 1 and 2 but by interference in a receiver detector of sub-carrier energy which is impressed upon the carrier energy. The separation of the two arrays 1 and 2 is made preferably a half wavelength at the sub-carrier frequency in order to provide the desired two major lobes directed down the runway as is described in the above mentioned co-pending application. As a result of this arrangement, it is possible as an approximation to consider that the localizer course is formed as though the sub-carrier waves which preferably should have frequencies in the vicinity of a megacycle per second are being radiated directly from the antennas. The sub-carrier signals thus interfere to form total sideband patterns which are characterized by different low modulation frequencies as will be explained later. The total sideband type patterns are applicable only at distances from the station large compared with the separation between the two localizer arrays. Very close to the runway, and between the localizer arrays, the formation of the total sideband patterns approximate a family of hyperbolas. Each hyperbola represents, of course, a given difference in the phases of the sub-carrier signals received from the two transmitting arrays. As a result of this hyperbolic characteristic, the course will have nearly straight sides in the critical region close to the point of contact rather than coming to the apex of the sharp pointed V, common to standard localizers. This is a most desirable characteristic for both human and automatic pilots.

Figure 2:
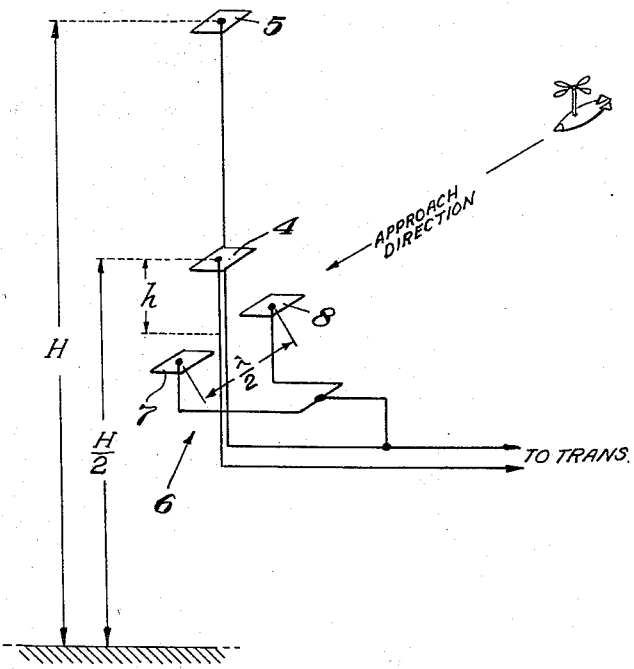
Fig. 2 shows in schematic form the glide path antenna system in accordance with the present invention.

Referring to Fig. 1 the glide path array is also positioned on one side of the runway and may comprise one of the radiators 2 common to the localizer arrangement. Referring to Fig. 2, this common radiator comprises the lower antenna array 4 of the glide path antenna system and is located a plurality of wavelengths at the carrier frequency above a ground reflecting plane. The upper antenna array 5 is located directly above the lower array at twice the height of the lower array.

If only the upper and lower arrays were utilized, the glide path over the runway would constitute a hyperbolic characteristic. In order to modify this path so as to provide the more desirable straight line path in the vicinity of touchdown, the glide path antenna array further comprises a modifier antenna array 6 mounted adjacent to the lower array 4 as shown in Fig. 2. The modifier array comprises two elements 7 and 8, preferably horizontally polarized, and so placed as to have their effective center of radiation directly under array 5. The line joining the centers of the two arrays lies parallel to the runway and the direction of approach. Since the arrays are fed in phase, as will be described later, the resulting pattern, neglecting the coefficient of the array, is a figure of eight with a null in the approach direction. This pattern when energized, has the purpose of modifying the vertical sideband pattern in the azimuth direction other than parallel to the runway in order to provide the required straight line again. This arrangement makes it possible to calculate the array design in order to produce a straight line or any desired path to the point of contact without resorting to the trial and error methods of previous arrangements. This is described in greater detail in the co-pending application of C. Watts assigned to the same assignee titled "Glide Path Beacon System" Ser. No. 12001 filed February 28, 1948.

One of the glide path arrays, as for example the lower array 4, is combined with one of the localizer arrays 2 shown in Fig. 1 into a single unit so that both the glide path and localizer energy may be commonly radiated from a single array. This array acts as one array of the localizer system as well as the lower antenna of the glide path arrangement.

The smaller and lighter radiating systems of the present invention form markedly reduced obstacles for air traffic. The arrays have so little mass that it may be possible to strike them at the leading edges of an aircraft in flight without resulting in more than minor damage to the aircraft. The associated transmitting equipment may be placed in water-tight vaults either flush or only a small distance above ground. The smaller arrays make it possible to more accurately direct the radiation to the desired and required direction thereby keeping signals to a minimum on reflecting objects with much less effort and expense than was formerly possible.

Referring to Fig. 3 a preferred embodiment provides a common crystal oscillator 9 for energizing both the localizer and glide path antenna systems. The output of the crystal oscillator is applied to two chains of frequency multipliers 10, 11, 12 and 13, 14, 15 to the carrier modulators 16 and 17. To provide sub-carrier modulation of the carrier energy for energizing the localizer arrays, a sub-carrier crystal oscillator 18 is provided. One output of the sub-carrier crystal oscillator 18 is applied to the sub-carrier amplifier 19 and the other output is applied to sub-carrier generator 20. Separate modulating frequencies $f1$ and $f2$ are impressed on the sub-carriers to identify the sideband patterns. For this purpose two R.-C. oscillators 21 and 22 are chosen whose difference in frequency is equal to $f1$ and their sum to $f2$. The R.-C. oscillator signals are heterodyned in the mixer 23. The heterodyning action produces components of $f1$ and $f2$ which are separated in the filters 24 and 25 and adjusted to be equal by a loss network in one filter.

The modulating frequencies $f1$ and $f2$ are applied to opposite terminals of the low frequency bridge 26. This bridge consists of a hybrid coil or its electrical equivalent. Amplifiers 27 and 28 connected to the output terminals of the low frequency bridge amplify the mixed low frequency signals. Amplifier 27 receives equal magnitudes of $f1$ and $f2$ both in their original phases. This energy then modulates the sub-carrier 19. Amplifier 28 receives equal magnitudes of $f1$ and $f2$ reversed from its original phase, which then modulates the sub-carrier sideband generator 20. In order to maintain the percentage of modulation nearly constant and to prevent over-modulation, both amplifier 27 and 28 may be equipped with automatic volume control as shown. The tank circuits in the sub-carrier amplifier and sideband generator are detuned sufficiently to produce a 45 degree phase shift in opposite directions. This 45 degree phase shift can be either leading in the amplifier and lagging in the sideband generator, or vice versa. The result of 90 degree phase displacement between the two outputs can be achieved opitionally without detuning by inserting a 90 degree delay line in one of the outputs. In any case, the 90 degree phase relationship may be monitored by the phase indicator 29 as described in greater detail in the co-pending application of S. Pickles and C. Watts mentioned above. In operation the phasing is merely adjusted to equalize the amplitudes of $f1$ and $f2$ received by the phase indicator.

After the phase shift the sub-carrier amplifier energy and sideband energy are delivered to opposite terminals of the sub-carrier bridge 30. This sub-carrier bridge combines the carrier and sideband energy and delivers the energy to the carrier modulators 16 and 17 modulating each approximately 50 per cent. The modulated carrier outputs from 16 and 17 are then applied to the localizer antenna arrays 1 and 4 located on opposite sides of the runway. A wide-band modulating transformer designed for use at the sub-carrier frequencies may be used to effect an impedance match between the transmission line and the modulators. A reversal is put in one arm of the sub-carrier bridge 30 so that the energy from the sub-carrier sideband generator 20 is delivered to the two sides out of phase, while energy from the sub-carrier amplifier 19 is delivered in phase. This produces the sub-carrier localizer pattern already discussed.

As shown in Fig. 3, the glide path antenna array 2 includes one of the localizer arrays 6. The general method of obtaining audio modulating frequencies for the glide path, namely $f3$ and $f4$, is identical to that already discussed in connection with the localizer. Therefore, the low frequency bridge 31 delivers in one of its outputs equal magnitudes of $f3$ and $f4$ in their original phases. These are then fed to the amplifier 32 which in turn is used to modulate the carrier energy applied to the carrier modulator 17. The output of 17 comprising carrier energy and $f3$ and $f4$ sidebands thereof is then applied to the lower antenna 4. In the other output of the bridge 31 there will be equal magnitudes of $f3$ and $f4$, with $f3$ in its original phase and $f4$ phase shifted 180 degrees from its original phase. The latter signal is then fed to the amplifier 33 which in turn is used to modulate the carrier sideband generator 34. The function of this sideband generator is to receive some signal from the frequency multiplier 15, and finally to produce only sidebands of the carrier energy modulated with $f3$ and $f4$. This sideband energy is delivered to the upper antenna 5 and the modifier antennas, 7, 8 of the glide path antenna array 2. It is properly phased with respect to the carrier and sideband energy of the lower antenna to produce maximum path sharpness. The low frequency energy from the amplifier 32 is used to modulate the carrier modulator 17 approximately 50 per cent, being applied in series with the modulation from the sub-carrier bridge 30. This comprises full modulation of the output stage. Both energies are, therefore, commonly radiated from a single array so that the array acts as one array of the localizer system as well as the lower antenna of the glide path system.

While I have described above the principles of my invention in connection with specific apparatus, and particular modification thereof it is to be clearly understood that this description is made only by way of example and not as a limitation on the scope of my invention.

I claim:

1. A radio beacon for guiding a craft along a given course, comprising a first and second radiator system, said first radiator system comprising first and second radiators each mounted on opposite sides of said course and oppositely disposed to one another, a source of energy, means for energizing said first radiator system for providing a radiant energy guiding pattern in a plane aligned in azimuth with said course, said second radiator system mounted on one side of said course and comprising said first radiator and a third radiator mounted vertically with respect to said first radiator, and means for energizing said second radiator system for providing a radiant energy guiding pattern over said course in a vertical curved surface intersecting said plane.

2. An arrangement as set forth in cleam 1, wherein said source of energy comprises carrier frequency energy and sub-carrier frequency modulated, carrier frequency energy, means for energizing said first radiator system with sub-carrier modulated carrier frequency energy, said first and second radiators being spaced apart a fraction of a wavelength at said sub-carrier frequency and a plurality of wavelengths at said carrier frequency.

3. A radio beacon for guiding a craft along a given course, comprising a first and second radiator system, said first radiator system comprising first and second radiators each mounted on opposite sides of said course and oppositely disposed to one another, a source of energy, means for energizing said first radiator system for providing a radiant energy guiding pattern in a plane aligned in azimuth with said course, said second radiator system mounted on one side of said course and comprising said first radiator and a third radiator mounted vertically with respect to said first radiator, and means for energizing said second radiator system for providing a radiant energy guiding pattern over said course in a vertical curved surface intersecting said plane, wherein said source of energy comprises carrier frequency energy and sub-carrier frequency modulated, carrier frequency energy, means for energizing said first radiator system with sub-carrier modulated carrier frequency energy, said first and second radiators being spaced apart a fraction of a wavelength at said sub-carrier frequency and a plurality of wavelengths at said carrier frequency, wherein said second radiator system comprises said third radiator mounted above said first radiator, and said radiators provide fixed directive patterns.

4. An arrangement as set forth in claim 3, wherein said means for energizing said second radiator system comprises said carrier frequency energy, said first and third radiators being spaced apart a plurality of wavelengths at said carrier frequency.

5. An arrangement as set forth in claim 3, wherein said third radiator is mounted at substantially twice the height of said first radiator above a ground reflecting plane.

6. An arrangement as set forth in claim 5, wherein said second radiator system further comprises a modifier antenna array for modifying said radiant energy guiding pattern along said curved surface to provide a substantially straight line portion over said given course in the vicinity of said second radiator system.

7. An arrangement as set forth in claim 1 wherein said second radiator system further comprises said third radiator mounted above said first radiator and a modifier radiator mounted adjacent said first radiator for modifying the resultant pattern of said third and first radiators over said course in the vicinity of said second radiator system.

8. An arrangement as set forth in claim 7 wherein said modifier radiator provides a directive radiation pattern.

9. An arrangement as set forth in claim 1, wherein said source of energy comprises carrier frequency energy and sub-carrier frequency modulated carrier frequency energy, means for energizing said first radiator system with sub-carrier modulated carrier frequency energy, said first and second radiators being spaced apart a fraction of a wavelength at said sub-carrier frequency and a plurality of wavelengths at said carrier frequency; a source of modulation waves, and means for modulating the energy supplied each of said radiator systems with said modulation waves to identify portions of the radiant energy patterns thereof.

10. An arrangement as set forth in claim 9 wherein said modulation wave source provides waves of different characteristic, whereby separate portions of said radiation patterns are distinctly identified.

11. A radio beacon for guiding a craft along a given course, comprising a first and second radiator system, said first radiator system comprising first and second radiators each mounted on opposite sides of said course and oppositely disposed to one another, a source of energy, means for energizing said first radiator system for providing a radiant energy guiding pattern in a plane aligned in azimuth with said course, said second radiator system mounted on one side of said course and comprising said first radiator and a third radiator mounted vertically with respect to said first radiator, and means for energizing said second radiator system for providing a radiant energy guiding pattern over said course in a vertical curved surface intersecting said plane, wherein said second radiator system further comprises said third radiator mounted above said first radiator, said third and first radiators being positioned above a reflecting plane to provide a pair of radiant energy lobes having a null aligned with a desired elevation angle over said course and a lobe overlying said null.

12. An arrangement as set forth in claim 11, wherein said second radiator system further comprises a modifier radiator mounted adjacent said first radiator for modifying the resultant pattern of said upper and said first radiator over said course and a lobe overlying said null.

13. An arrangement as set forth in claim 11 wherein said second radiator system further comprises a modifier radiator mounted adjacent said first radiator for modifying the resultant pattern of said upper and said first radiator over said course in the vicinity of said second radiator system.

14. An arrangement as set forth in claim 13 wherein said modifier radiator provides a figure of eight pattern with its null in the direction of a line parallel to said course and passing through said modifier radiator.

CHESTER B. WATTS, Jr.

REFERENCES CITED

The following references are of record in the file of this patent:

UNITED STATES PATENTS

| Number | Name | Date |
|---|---|---|
| 2,289,899 | Bond | July 14, 1942 |
| 2,373,090 | Alford | Apr. 10, 1945 |
| 2,379,442 | Kandoian | July 3, 1945 |
| 2,397,531 | Busignies | Apr. 2, 1946 |
| 2,400,736 | Brown | May 21, 1946 |
| 2,406,734 | Alford | Sept. 3, 1946 |
| 2,406,876 | Watts | Sept. 3, 1946 |
| 2,416,342 | Newhouse | Feb. 25, 1947 |
| 2,419,551 | Himmel | Apr. 29, 1947 |
| 2,433,351 | Earp | Dec. 30, 1947 |
| 2,449,999 | Armstrong | Sept. 28, 1948 |

FOREIGN PATENTS

| Number | Country | Date |
|---|---|---|
| 456,838 | Great Britain | Nov. 11, 1936 |